July 6, 1965   J. A. CASH, JR   3,192,886
BEDDING COMPONENT MANUFACTURING MACHINE
Filed April 5, 1962   9 Sheets-Sheet 1

INVENTOR.
JAMES A. CASH, JR.
BY Arthur Robert
Atty

July 6, 1965  J. A. CASH, JR  3,192,886
BEDDING COMPONENT MANUFACTURING MACHINE
Filed April 5, 1962  9 Sheets-Sheet 2

INVENTOR.
JAMES A. CASH JR.
BY

INVENTOR
JAMES A. CASH, JR.

July 6, 1965  J. A. CASH, JR  3,192,886
BEDDING COMPONENT MANUFACTURING MACHINE
Filed April 5, 1962  9 Sheets-Sheet 6
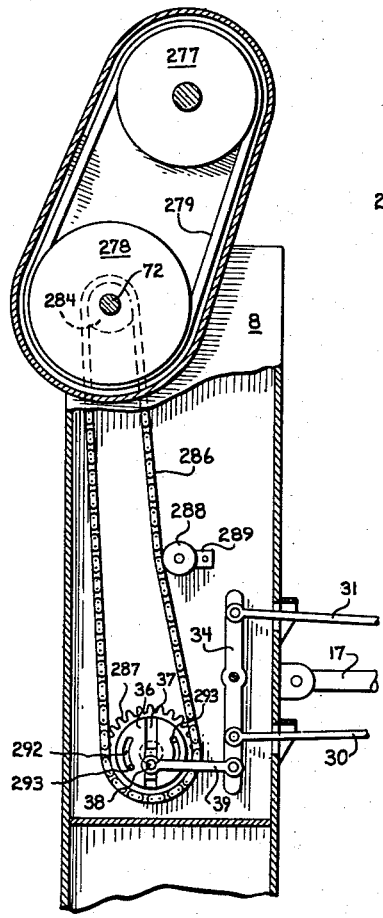
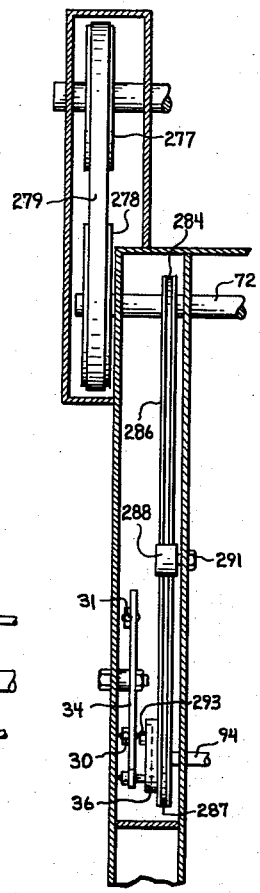
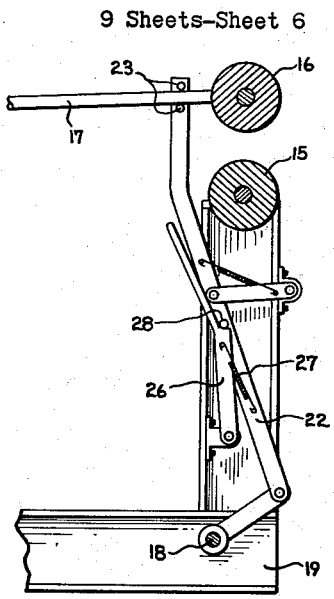
Fig. 10.
Fig. 8.  Fig. 9.
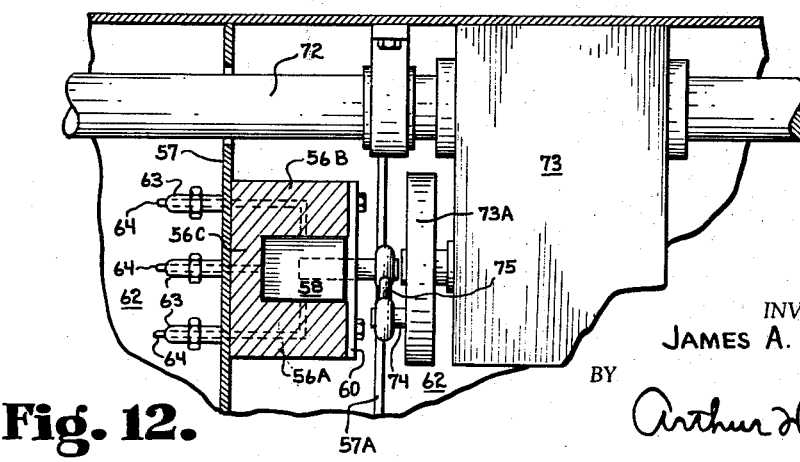
Fig. 12.
INVENTOR.
JAMES A. CASH, JR.
BY
Arthur H. Robert

INVENTOR.
JAMES A. CASH, JR.

July 6, 1965 J. A. CASH, JR 3,192,886

BEDDING COMPONENT MANUFACTURING MACHINE

Filed April 5, 1962 9 Sheets-Sheet 9

INVENTOR.
JAMES A. CASH, JR.
BY Arthur Robert
Atty

# United States Patent Office 3,192,886
Patented July 6, 1965

3,192,886
BEDDING COMPONENT MANUFACTURING MACHINE
James A. Cash, Jr., La Grange, Ky.
Filed Apr. 5, 1962, Ser. No. 185,296
9 Claims. (Cl. 112—2)

This invention relates to a multi-needle machine for use in securing together the components of an elongate multi-layer web by progressively sewing the web in the direction of its length along a number of longitudinally-extending transversely-spaced stitch lines. More particularly, the invention is concerned with a machine for sewing at least two layers of wide bedding material ranging from thin lightweight material to relatively thick material such as mattress pads which are usually composed of one relatively thin strong layer of scrim and another relatively thick layer of loosely matted padding.

So far as I know, the prior practical art has used multi-needle machines of the continuous feed type and of the intermittent feed type. In the continuous feed type, two or more groups of needles are employed and these are arranged so that the needles of all groups move horizontally with the web as they move vertically through the web while the operating cycle of one group is offset from that of another group in a manner such that the needles of one group or the other are always in the web. All of the intermittent types of machines, which have heretofore been employed, have been restricted to the sewing of short stitches and relatively lightweight webs.

The principal objects of the present invention are: to provide a multi-needle machine of the intermittent feed type, which is not restricted to short stitches or lightweight webs but which is capable of sewing a wide variety of webs of the types presently employed including those ranging from lightest to the heaviest weights, from the smallest to the largest thicknesses and from the narrowest to the widest widths; and to provide a multi-needle machine of the intermittent feed type which is capable of operation over a wide range of speeds including those normally considered high by present day standard.

Speaking generally, my principal objects are achieved in a multi-needle machine of the intermittent type which basically comprises: (A) a frame having, between its longitudinally-spaced front and rear ends, (1) a transversely spaced pair of upright frame members and (2) a vertically spaced pair of cross members extending horizontally from one upright member to the other and secured to both; (B) a web advancing means operable, when actuated, to advance the web forwardly between said upper and lower cross members in intermittent fashion; (C) a multi-needle bar (1) extending transversely between said web and upper cross members, and (2) supporting a transversely extending succession of vertically-arranged horizontally-spaced sewing needles, (D) a needle-operating mechanism mounted on the upper cross member, (1) said mechanism being operable, when actuated, to reciprocate said needle bar vertically and thereby move said needles downwardly and upwardly through the web to form depending loops of sewing thread on the under side thereof; (E) a lower thread-locking mechanism mounted on the lower cross member, (1) said mechanism being operable, when actuated, to engage and lock said loops of sewing thread; and (F) drive means (1) for actuating said web-advancing and needle-operating means to advance the web and reciprocate the needles alternately, and (2) for actuating the thread-locking mechanism in timed relationship with the needle-operating mechanism so as to engage and lock each succession of depending sewing thread loops.

Other important objects of the present invention are: to provide a multi-needle machine of the intermittent feed type which is capable of sewing stitches ranging in length from the smallest to the largest of those presently employed; and to provide a simple and sturdy means for advancing the web intermittently which can be simply, easily and precisely adjusted to any desired stitch length within its range.

In accomplishing the foregoing objects, I provide a web advancing means, which preferably includes a pair of web feeding pinch rolls and an oscillatable seesaw lever intermittently driving those rolls through one-way clutches. The seesaw lever is oscillated by means of a link interconnecting it with the radial crank arm of a rotary member. The radial length of the crank arm can be easily, quickly and precisely adjusted to vary the angular throw of the seesaw lever and thus correspondingly vary the distance over which the web moves during each advance, this distance necessarily determining and equalling the stitch length.

Other objects are: to provide simple and rugged needle-operating mechanism for supporting and reciprocating a bank of needles; to provide a needle-operating mechanism which is capable of reciprocating a bank of needles extending over widths ranging up to the largest of the presently employed widths, at any speed over a wide range and through a substantial vertical distance which readily accommodates the thickest web; and to provide, in a needle-operating mechanism, a means for converting rotary motion to reciprocating motion and a simple effective arrangement for lubricating the motion converting means which requires little or no maintenance over extended operating periods.

The preceding objects of my invention—which specifically relate to the construction, operation and lubrication of this needle-operating mechanism—are accomplished: (a) by mounting the needle-operating mechanism on the upper cross member, which preferably is made hollow; (b) by extending a rotary shaft across the width of the machine through the upper part of this upper hollow cross member; (c) by dividing the lower part of this upper hollow cross member into dry and oil bath chambers; (d) by supporting the multi-needle bar from slide blocks mounted in vertical slideways in the dry chambers; and (e) by providing motion converting means interconnecting the shaft with the slide block so as to use the rotary movement of the shaft to effect the vertical reciprocation of the slide blocks, multi-needle bar and the needles of that bar. An arrangement of this character is simple and rugged, capable of reciprocating a wide bank of needles at a high speed over a large vertical distance. Furthermore, the slideways can be maintained in a thoroughly lubricated condition over a long time by a simple capillary means interconnecting the slideways with the oil baths.

Other objects are: to provide a lower thread-locking mechanism of simple and sturdy character, which can be operated at high speeds over the largest of the presently encountered widths; to provide, in a thread-locking mechanism, sewing thread retaining hooks, which are arranged to have minimum susceptibility to interference with damaged sewing needles; and to provide, in a thread locking mechanism, a means for converting rotary motion to oscillatory motion and a simple effective arrangement for lubricating the motion converting means which lubricating arrangement requires little or no maintenance over extended operation periods.

The preceding objects relate to the construction, operation and lubrication of the lower thread-locking mechanism. In accordance with my invention, these objects are accomplished: (a) by mounting the lower thread-locking mechanism on the lower cross frame member, which preferably is made hollow; (b) by extending a second rotary power shaft across the width of the machine within the upper portion of the lower hollow cross member; (c) by mounting a transverse succession of sewing thread retaining hooks on the front side of the lower cross member; (d) by interconnecting this second power shaft with the hooks through means including (1) an oscillatable shaft passing through a wall of the lower cross member, (2) connecting means between the outside portion of that shaft and the hooks, and (3) motion-converting means between the inside portion of that shaft and the rotary powered shaft; and (e) providing the lower cross member with an oil bath in position to be subjected to splash action by moving parts of the motion-converting means. The attainment of high thread-locking speeds is more effectively promoted by dividing the interconnecting means into several groups. Interference between the needles on the one hand and the thread-locking mechanism is minimized by having the hooks operate in an area located at the "web" (or thread-leaving) side of the needle and, when retainer posts are employed for the locking thread loops, by positioning such posts on the rear side of the needle, it being understood that most needle damage occurs through the failure of the needle to clear the forwardly advancing web which thereupon bends the needle forwardly. Obviously the splash lubrication provided will operate over an extended period without requiring any maintenance.

Other objects and features of my invention reside in the use of a single presser foot for all needles, in biasing that presser foot into continuous contact with the web during both the web sewing and the feeding intervals and in adjusting its biasing pressure.

The full nature of the invention will be understood from the accompanying drawings and the following description and claims:

FIG. 8 is a fragmentary side sectional view taken along line 8—8 in FIG. 6 and showing details of the feed roll drive.

FIG. 9 is a fragmentary front sectional view taken along line 9—9 in FIG. 5 showing details of the feed roll drive.

FIG. 10 is a fragmentary side sectional view taken along line 10—10 of FIG. 6 and showing details of the locking and releasing mechanism for holding the upper feed roll in its raised position.

FIG. 12 is a fragmentary horizontal sectional view taken along the line 12—12 of FIG. 11.

FIG. 18 is an enlarged bottom plan view of a fragment of an assembly of material sewn together by the illustrated embodiment of the invention and showing the nature of the stitch obtained.

FIG. 19 is an enlarged vertical section through the fragment of FIG. 18, the section being taken in the plane 19—19 of FIG. 18 along a line of stitches and further illustrating the nature of the stitch obtained.

BASIC ELEMENTS

Figure 1:
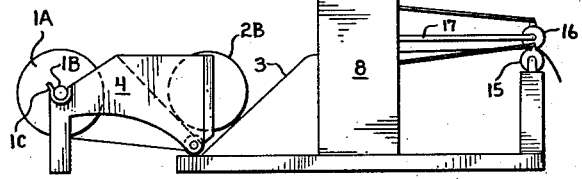
FIG. 1 is a schematic view showing the basic elements of the machine and the flow of material therethrough.
Figure 2:
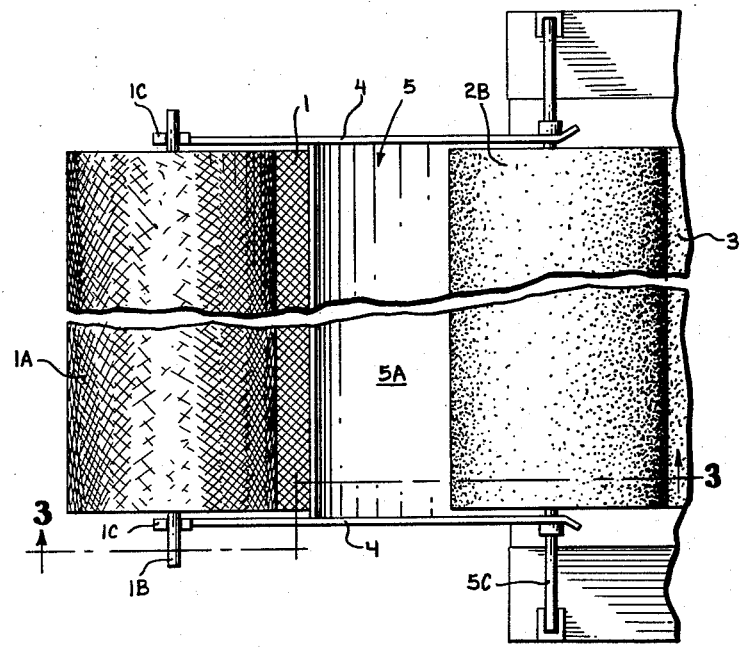
FIG. 2 is a top plan view of the supply end of the machine.
Figure 3:
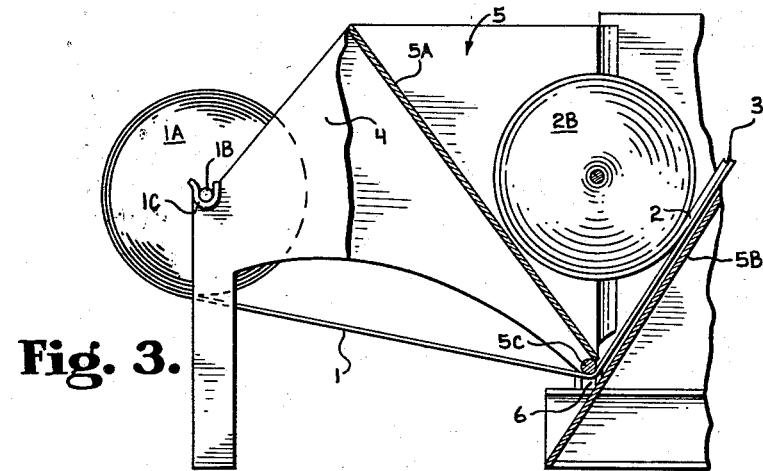
FIG. 3 is a view partly in side elevation and in vertical section taken along line 3—3 of FIG. 2 to show the scrim roll support in elevation and the padding roll trough in section.

The apparatus, as illustrated in the drawings, broadly includes the following basic elements, viz: (I) a supply source of elongate webs of insul pad materials; and (II) a stitching machine for pulling an elongate web of assembled material from said supply source at spaced web moving intervals, and for stitching said elongate web along a series of parallel stitch lines at web sewing intervals between said web moving intervals. During each web moving interval, the stitching machine moves the web forwardly a distance equal to the length of at least one stitch and during each web sewing interval it sews a single stitch in each stitch line.

SOURCE OF SUPPLY (FIGS. 2, 3)

The supply source comprises: means for supporting an elongate web of scrim 1, preferably in the form of a roll 1A, at a location spaced rearwardly from the rear end of the stitching machine and in a manner permitting said roll of scrim to unwind as the web 1 is pulled forwardly toward the stitching machine; and means for supporting an elongate web of insul padding 2, preferably in the form of a roll 2B, at a location arranged between the scrim roll 1A and the rear end of the stitching machine and in a manner not only permitting said web of insul padding 2 to unwind as the scrim web 1 is pulled forwardly but also causing said padding web 2 to have overlying engagement with said scrim web 1 and thereby form an assembled web 3 which moves forwardly into the stitching machine.

The roll of scrim 1 is rotationally supported upon a bar 1B through its center and mounted in the U-shaped receivers 1C at the rear end of a pair of rigid laterally-spaced metal side panels 4. The roll 2B of padding 2 is rotationally supported in an upwardly-open metal trough 5 having transversely-extending, downwardly-converging rear and front walls 5A and 5B respectively. The rear wall 5A of the trough is connected rigidly to the side panels 4. The lower front corners of the side panels are pivotally supported on a bar 5C extending across and mounted to the frame of the stitching machine. The front wall 5B of the trough is formed by a rearwardly declining apron on the rear end of the stitching machine. The lower ends of the trough walls 5A and 5B are spaced to provide a slot-like bottom opening 6 through which the scrim passes to extend upwardly along the inner face of the front wall 5B of the trough on its way into the stitching machine. With this arrangement, the periphery of the padding roll 2B rests upon the underlying scrim 1. The forward movement of the scrim is thus used to feed the padding web by unwinding the padding roll and in this way avoid placing any tension on the padding web. The smooth bar 5C, which may be provided with a roller if desired, affords a low-friction support for the scrim as it changes direction to enter the opening 6.

STITCHING MACHINE

The stitching machine comprises: a frame; means for intermittently pulling and thereby advancing the elongate scrim-padding web assembly 3 forwardly through the stitching machine; and a double-thread chain-stitch sewing means for stitching said web, along each of a series of parallel stitch lines, as it is pulled through the machine, said sewing means including an upper needle-operating mechanism and a lower thread-locking mechanism.

Figure 4:
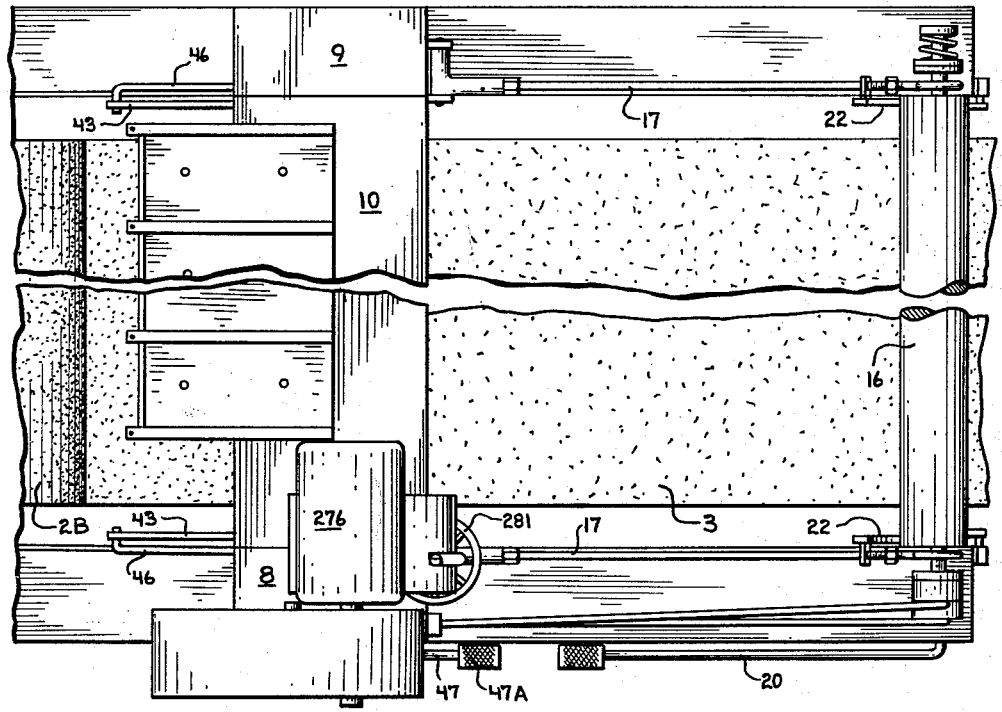
FIG. 4 is a top plan view of the stitching machine.
Figure 5:
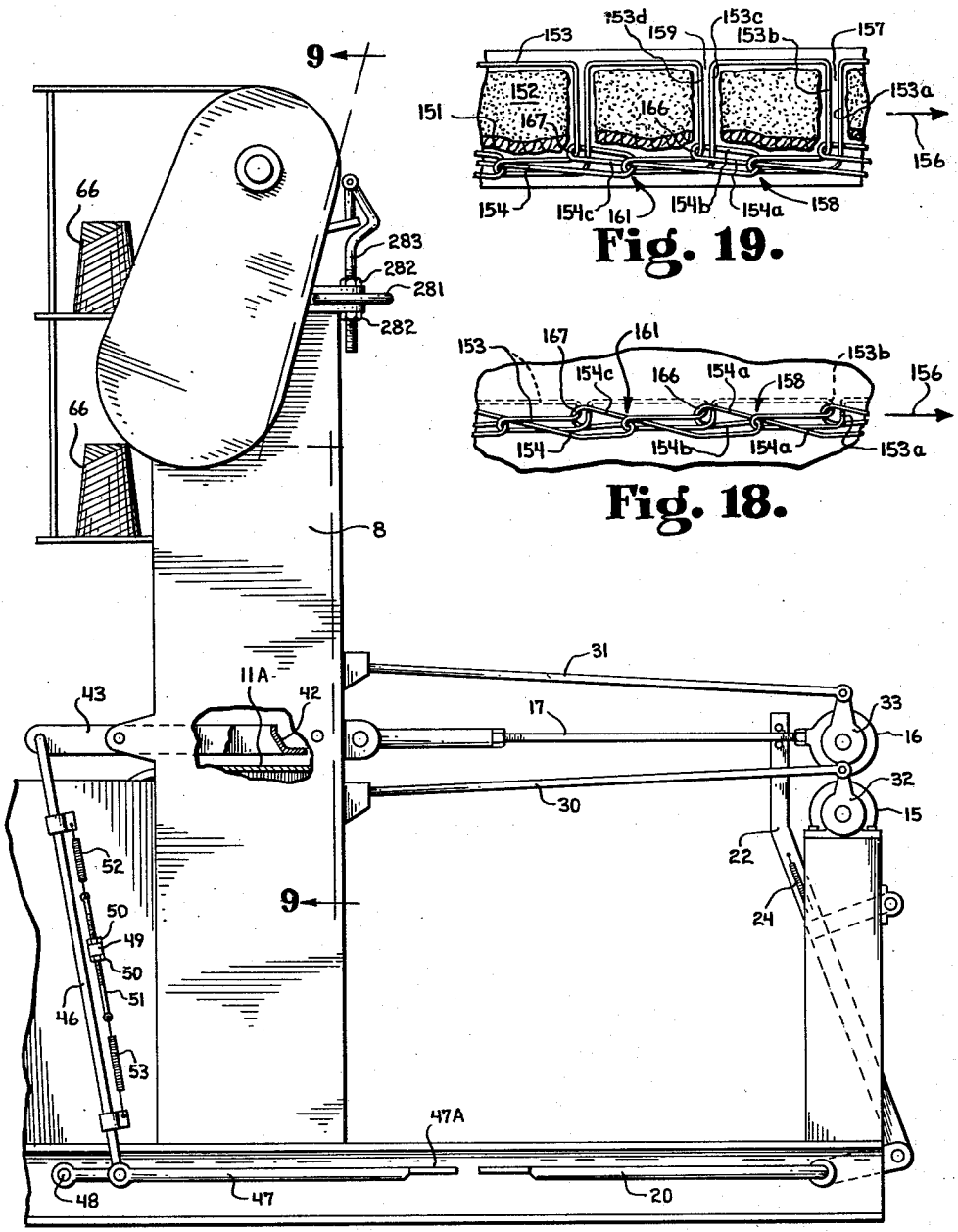
FIG. 5 is a side elevational view of the right-hand side (drive motor side) of the stitching machine.
Figure 6:
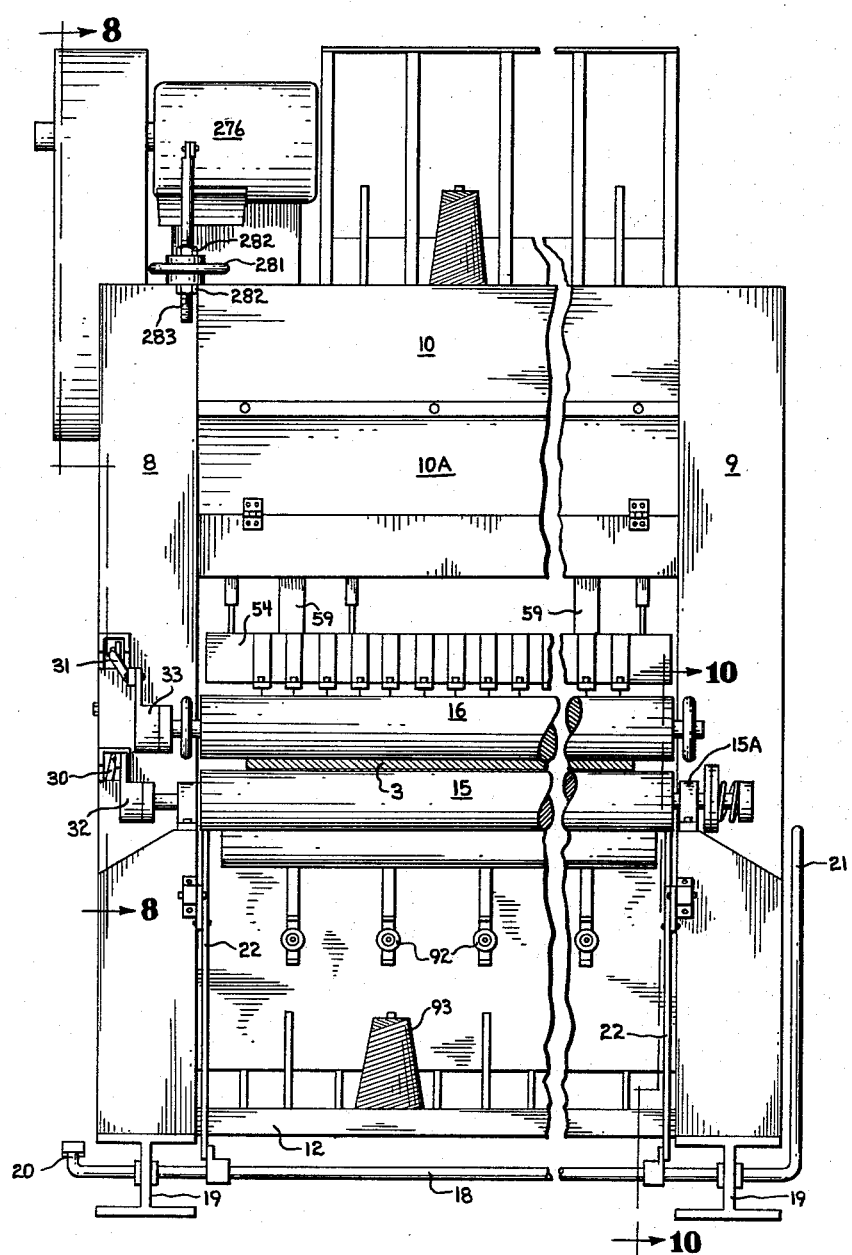
FIG. 6 is a front elevational view of the stitching machine.
Figure 7:
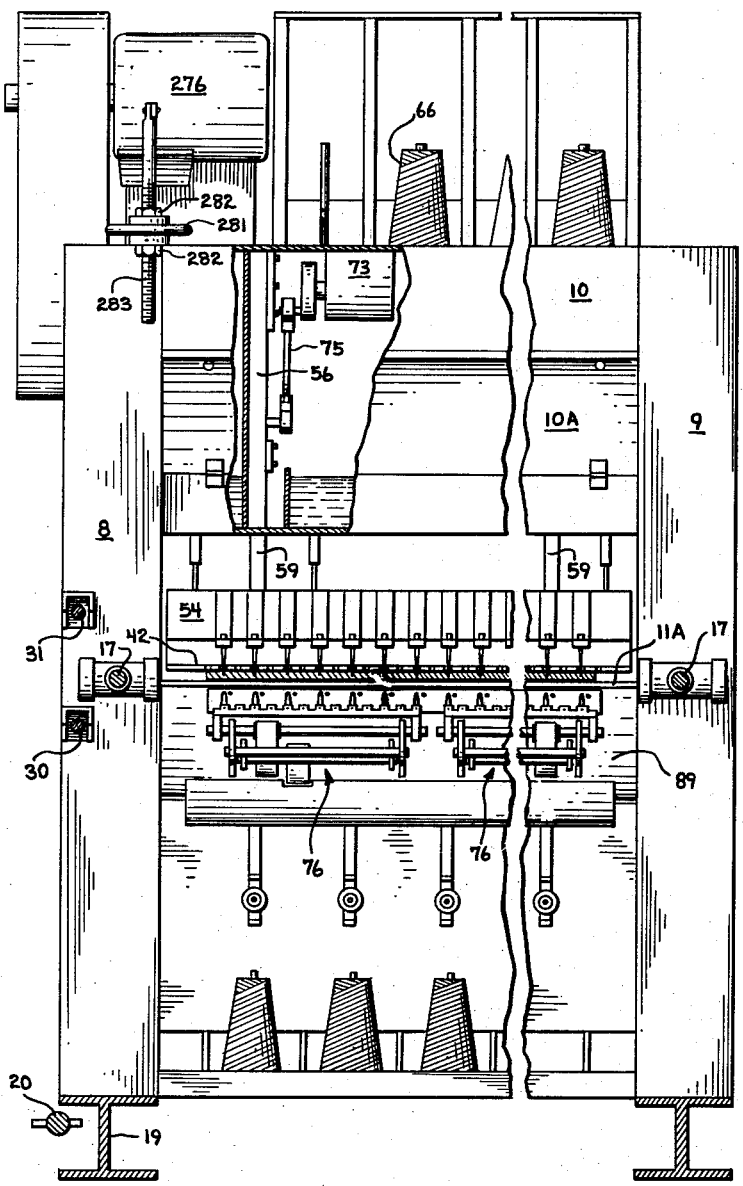
FIG. 7 is a front elevational view of the stitching machine with the feed rolls omitted and with portions broken away to illustrate certain structural details.

*Frame (FIGS. 4–6).*—The frame of the stitching machine comprises: two laterally-spaced upright frame members 8 and 9 one on each side of the path of the web 1; and three vertically-spaced horizontal members interconnecting the upright members 8 and 9. The three horizontal members include: an upper cross member 10 spaced substantially above the path of the web; a center cross member 11, the top side or table 11A of which slidably supports the web; and lower cross member 12. The upright members 8 and 9 and the upper and center cross members 10 and 11 are hollow.

The front side of the upper cross member 10 is provided with an access door 10A extending across the full width of the machine. The sewing operation is performed along the front edge of the table 11A; hence, its front edge is serrated to accommodate the sewing needles and to support the adjacent portion of the web assembly against the thrust of the needles.

*Web advancing means (FIGS. 4–6, 10).*—The web advancing means comprises: a pair of pinch feed rolls mounted on the front end of the machine for relative movement between an operative position, in which they cooperatively pull the web, and an inoperative position, in which they are spaced from each other to allow a web to be threaded between them; means for relatively moving and releasably latching said rolls in their inoperative position; oscillating means operable, when actuated, to rotate the pinch rolls in the web advancing direction intermittently so as to advance the web assembly during each web moving interval and hold it stationary during each intervening web sewing interval; means for adjusting the rate of web feed; and means for quickly stopping the pinch rolls at the end of each web feeding interval.

*Pinch rolls.*—The pinch rolls 15 and 16 extend transversely across a front end extension of the stitching machine frame with one roll arranged over the other. The lower roll 15 is rotationally carried on the forward extension of the frame by suitably mounted ball bearing collars 15A. The upper roll 16, which, in the web-moving position, normally presses gravitationally downward against the lower roll 15 through the interposed web assembly 3, is mounted on the frame for relative upward movement to an inoperative position where it is spaced upwardly from the lower roll for web-threading purposes. Accordingly, the opposite ends of the upper roll 16 are connected to a pair of oppositely disposed radius or guide rods 17, each of which extends rearwardly to the corresponding frame upright (8 or 9) and is pivoted thereto.

*Means for moving upper roll to web-threading position (FIG. 10).*—The upper roll may be moved to its inoperative position by any suitable means. The manually operated mechanism shown comprises: a bottom cross shaft 18 carried by the lower portion 19 of the front end of the frame for angular rotational movement about its long axis; a foot-operated lever 20 on the right-hand (drive motor) side of the machine and a hand-operated lever 21 on the left-hand side of the machine respectively connected to the opposite ends of the bottom cross shaft 18 for angularly turning it; a pair of vertical links 22, one on each side of the machine extending from the corresponding manually-operated lever (20 or 21) upwardly to the corresponding radius rod 17 for the upper roll; a pair of vertically-spaced pins 23 on the upper end of each vertical link 22, each pair of pins straddling the radius rod 17 adjacent to it; and a pair of springs 24, one at each side of the machine resiliently urging the upper roll downwardly against the lower roll and correspondingly resisting the upward movement of the upper roll. When the vertical links 22 are raised lengthwise by lever 20 or 21, the pins 23 will swung the radius rods 17 upwardly to raise the upper roll.

*Means for latching the upper roll in the web-threading position (FIG. 10).*—The upper roll may be detachably latched in its upper position by any suitable mechanism. In the arrangement shown, an upright latching lever 26 is located along one of the front vertical corners of the stitching machine and positioned adjacent the rear side of one of the vertical roll-raising links 22. The lower end of this latching lever 26 is pivotally mounted on the frame with its upper end biased forwardly by a spring 27 so as to press its upper end portion forwardly against a stop pin 28 on the adjacent roll-raising link 22. As that link moves upwardly, the stop pin 28 moves upwardly with it while latching lever 26 presses forwardly against the stop pin 28. When the upper roll 16 reaches its upper inoperative position as shown in FIG. 10, stop pin 28 has cleared the upper end of the spring-biased latching lever 26 permitting lever 26 to swing forwardly into its latching position underneath stop pin 28 as shown in FIG. 10. After a web 3 has been threaded between the pinch rolls 15 and 16, the latching lever 26 may be manually returned rearwardly to its unlatching position permitting the upper roll to be lowered (with or without manual restraint) back to its web-moving position.

*Oscillating means for rotating pinch feed rolls (FIGS. 5, 6, 8, 9).*—The oscillating means for rotating the pinch rolls intermittently, comprises: a lower arm 30 connecting a one-way clutch 32 on the lower feed roll 15 to the lower end of a vertically-arranged centrally-pivoted seesaw lever 34; and an upper arm 31 connecting a one-way clutch 33 on the upper roll 16 to the upper end of said seesaw lever 34. It will be understood that a one-way clutch is one which, as it moves in one direction, engages and moves a driven member with it and which, as it moves in the opposite direction, releases and moves relatively to that driven member.

The seesaw lever 34 is located in the upright frame member 8. During its angular movement in one direction, it operates the clutches 32 and 33 to advance the web. During its return movement in the opposite direction, which corresponds with the sewing interval, the web remains stationary. Thus, the seesaw lever 34 undergoes, during each interval of complete oscillation, a web advancing movement in one direction and a return movement in the opposite direction, during which the web is stationary.

*Means for adjusting the rate of the web feed (FIGS. 8, 9).*—The web feed rate is adjusted simply by adjusting the length of the stroke of the web feed oscillating means. The means for adjusting this stroke length comprises: a hub 36, rotationally mounted in the upright frame member 8; and an adjustable crank arm mechanism interconnecting the seesaw lever 34 with the hub 36.

The adjustable crank arm mechanism comprises: means forming a radial dove-tail slot 37 on the hub 36, this slot preferably extending diametrically across the hub; an eccentric pin 38 mounted in the slot 37 for adjustment to and securement in selected positions of different radii along the slot; and a link 39 interconnecting the adjustable eccentric pin 38 with the seesaw lever 34. With this arrangement, the position of pin 38 in the slot 37 determines the "throw" of the see-saw lever, i.e., the magnitude of the angle over which the seesaw lever 34 is oscillated. For a given frequency of oscillation, a progressive increase in the throw of the seesaw lever 34 will effect a progressive increase in the amount of web, which is fed during each web advancing movement of the lever 34 and in the length of the stitches sewn by the stitching machine.

While the sewing means may be in the form of a lock stitch mechanism or a single-thread chain-stitch mechanism, the illustrated embodiment incorporates a novel double-thread chain-stitch mechanism.

*Sewing means.*—The sewing means illustrated includes: an upper needle-operating mechanism; and a lower thread-locking mechanism. These are hereinafter described as separate elements.

*Upper needle-operating mechanism.*—The upper needle-operating mechanism comprises: a presser foot; means for raising the presser foot; means for adjusting the presser foot pressure; means supporting a transversely-extending horizontal succession of spaced sewing needles for vertical reciprocation downwardly into and upwardly out of the web as a unit; means for lubricating the reciprocating support means; means for supplying tensioned sewing thread to each needle; means for pulling thread from said supply; and means operable, when actuated, to reciprocate the needle and assist in feeding sewing thread thereto.

*Presser foot (FIGS. 5, 7, 11, 13).*—The presser foot is in the form of a long narrow heavy plate 42 extending, in the direction of its length, completely across the width of the machine with its front serrated edge overlying (and aligned with) the front serrated edge of the table 11A provided by the top of the center cross frame 11. This presser foot 42 is rigidly mounted at its opposite ends on the front ends of a pair of levers 43 which extend rearwardly from the presser foot and which are pivotally mounted on the upright frames 8 and 9 in a manner such that most (if not all) of the weight of the presser foot 42 normally urges it downwardly about the pivots of lever 43 to its operative position in which it presses the web downwardly against the table 11A.

*Means for raising the presser foot (FIG. 5).*—A means for raising the presser foot is provided at each side of the machine. This means includes: a vertical link 46 interconnecting the rear end of the corresponding presser foot lever 43 with a bottom foot pedal lever 47 which is pivotally mounted at 48 on the frame. When the foot pedal 47A is pressed downwardly, it pulls the rear ends of the presser foot levers 43 downwardly whereby the presser foot, on the front ends of levers 43, is raised to a position such, as, for example, that indicated by the dotted outline in FIG. 13. The foot pedal levers on opposite sides of the machine are connected along the axis between their pivotal mountings to the frame by a common cross bar or rod (not shown) which turns when either foot pedal is operated so as to insure joint operation of both raising means when one foot pedal 47 is operated.

*Presser foot pressure-adjusting means (FIG. 5).*—A presser foot pressure-adjusting means is provided at each side of the machine and associated with the adjacent vertical presser-foot-actuated link 46. Each presser foot pressure-adjusting means comprises: a slotted or apertured lug or tab 49 secured to the frame; one or two adjusting nuts 50, said nuts being held against vertical movement in either direction by engagement with lug 49 and the vertically arranged screw 51 extending through the aperture of lug 49 and the threaded bores of the nuts 50 and threaded thereto so that, as the nuts are rotated in one direction or the other, the screw will move upwardly or downwardly relatively to the nuts, said screw preferably having a neutral position; an upper spring 52 interconnecting the upper portions of the link 46 and the screw 51 in a manner such that spring 52 is in a relaxed state when the screw is in its neutral position but is progressively tensioned as the screw moves progressively downward from its neutral position; and a lower spring 53 interconnecting the lower portions of the link 46 and the screw 51 in a manner such that the lower spring 53 is in a relaxed state when the adjusting screw is in a neutral position and is progressively tensioned as the adjusting screw is moved upwardly out of its neutral position. With this arrangement, it will be appreciated that the upper spring functions to decrease the presser foot pressure when the upper spring is tensioned while the lower spring correspondingly functions to increase that pressure.

*Means supporting needles for reciprocation (FIGS. 6, 7, 11, 12, 13).*—The means for supporting a succession of sewing needles for reciprocation comprises: a multi-needle cross bar 54 spaced below the top cross frame 10 and arranged to extend across the width of the machine, this bar having means for fixedly securing the vertically arranged needles 55 at one inch horizontal spacings; a series of say four reciprocating slide units mounted within the hollow top cross frame 10 at horizontally-spaced intervals, each slide unit including slideways 56 having a front 56A and rear 56B vertically-arranged horizontally-spaced stationary slideway members and a right-hand member 56C mounted on a rigid vertically-arranged front-to-rear partition 57 in the chamber of hollow cross frame 10, and a vertically movable slide block 58 arranged between (and slidably mounted on) the slideways 56; and a series of vertically-arranged transversely-spaced slide bars 59, one for each slide unit, each bar 59 extending upwardly through the bottom of cross frame to connect its slide block 58 to the underlying multi-needle bar 54 so that the reciprocation of the slide blocks 58 will effect the corresponding reciprocation of the underlying multi-needle bar 54. Upper plate 60 and lower plate 60A are secured to the left-hand sides of the front and rear slideway members.

*Means for lubricating the reciprocating support means (FIGS. 11, 12, 13).*—The means for lubricating the reciprocating support means comprises: a means partitioning the bottom of the hollow cross frame member 10 into a series of oil chambers 62, each chamber 62 extending from the lower front wall to the lower rear wall of crossmember 10 and bounded on one side by a partition 57 and on the other side by a partition 57A; and capillary means for conducting lubricant from each bath up to the adjacent slide unit, said capillary means including several hollow tubes 63 extending from the bath to the slide unit, each tube having open ended communication with both the bath and the slide unit, and a wick 64 arranged within each tube to conduct lubricant from the bath to the slide unit.

In the arrangement shown, each slide unit is lubricated, on one side, through three wicks 64 in one chamber of the hollow cross frame 10 and, on the other side, through a single wick 64 in the next chamber of the cross frame. This novel construction avoids the necessity of providing a seal between the connecting bars 59 and the bottom of crossmember 10.

*Means for supplying tensioned sewing thread (FIG. 13).*—The means for supplying tensioned sewing thread to each needle comprises: a number of sewing-thread supply spools 66 mounted on the back and top sides (top mounted spools shown in FIGS. 6 and 7) of the cross frame member 10, one spool for each needle; and suitable thread tensioning means to maintain each thread from each spool under a desired degree of tension, this means including the spring loaded adjustable tensioner 67, an apertured thread-puller cross bar 68 spaced rearwardly from (but arranged parallel to) the multi-needle cross bar 54 and rigidly connected to it (through the reciprocating bars 59 of the needle supporting means) so as to move up and down with the multi-needle cross bar 54.

Here it may be helpful to note that for purposes of description herein each needle 55 is said to have front and back faces, a supply side and a web side. Each sewing thread 65 extends from its supply spool 66 downwardly along the rear side of the upper cross frame 10, thence forwardly in the space between upper cross frame 10 and the top side of the web. This forwardly extending thread is made to extend successively through an opening in the reciprocating thread-puller bar 68 and over the top side of the multi-needle cross bar 54, thence downwardly to the supply side of the needle, thence through the needle and finally upwardly from the web side of the needle to the web.

*Means for pulling thread from said supply (FIGS. 11, 13).*—The means for pulling thread from said supply comprises: stationary thread-pulling cross bars 69 arranged in the space between the web and the upper cross frame 10 at a fixed elevation such that they are spaced from both the web and the cross frame 10; and the reciprocating thread-puller bar 68 rigidly mounted on the slide bars 59 in position to extend between the vertically reciprocating multi-needle bar 54 on its front side and the stationary thread-guide bar 70 on its rear side. The fixed elevation of the stationary cross-bar 69 is such as to maintain slidable engagement with the tensioned thread only during the last 20% to 30% of the downward stroke of the needle. During the first 70% to 80% of the needle down-stroke, each tensioned thread will extend straight across the space between the thread puller bar 68 and the top of the multi-needle bar 54 as it approaches the thread pulling bars 69.

However, when only 20% to 30% of the down-stroke of the needle remains, the top side of the interposed fixed stationary thread pulling bars 69 will initially engage this straight stretch 65A of forwardly-extending downwardly-moving tensioned sewing thread. Through such engagement, the thread pulling bar 69 will pull the thread slidably at the elevation of its top side while the needle 55, on one side of bar 69 and the moving thread puller bar 68 on the other side thereof will carry their engaged portions of the thread downwardly with them as they complete the final 20% to 30% of the down-stroke.

*Means operating, when actuated, to reciprocate the needle (FIGS. 11, 12, 13).*—Each needle is supported for reciprocation through an assembly comprising a multi-needle bar 54, the slide bars 59 and the vertically-movable slide blocks 58. To effect the reciprocation of the needles, an operating means is provided and made operative when actuated to move the needles in a vertical plane through the pad materials supported on the table 11A. This operating means comprises an upper rotary cross-shaft 72 extending from the interior of the frame upright 8 through the upper portion of the hollow frame crossmember 10 into the frame upright 9; a series of 2:1 reduction gear assemblies 73 in the hollow frame assembly 10, one for each slide block 58, each reduction gear having a "full speed" rotary input member connected to and driven by the upper cross-shaft 72 and a "half speed" rotary output member 73A; and motion converting means including crankpin 74 and connecting rod 75 interconnecting the "half speed" rotary output member of the reduction gear with the slide block 58 of the corresponding slide unit and using the rotary motion of the said output member to reciprocate said slide block once during two complete revolutions of shaft 72.

In other words, two complete revolutions of shaft 72 are required to effect one complete reciprocation of slide block 58. Furthermore, the reciprocation of slide block 58 is synchronized with the web feed means such as to effect a single-stitch sewing operation when the web is stationary and then to hold the needle up out of contact with the web while the web is advanced toward (and until it is stopped in) its operative position for the next single-stitch sewing operation.

*Drive and synchronizing means (FIGS. 6, 8, 9, 11, 14).*—The drive for the stitching machine originates at the electric motor 276 driving the variable speed pulley 277 keyed or splined to the motor shaft and connected through belt 279 to drive pulley 278. The drive motor 276, as illustrated, is pivotally mounted on the stitching machine frame to permit a desired adjustment in the operating speed to be obtained by adjusting the wheel 281 in the motor raising (or lowering) direction and thereby lowering (or raising) the speed of belt 279. In the arrangement shown in FIG. 8, with the motor 276 rotating the variable speed pulley 277 at 1750 r.p.m., the speed adjustment enables shaft 72 to vary from 500 to approximately 1500 r.p.m. A suitable adjustment can be maintained by the provision of the locknuts 282 on the adjustment bolt 283.

The pulley 278 may be keyed or splined to the upper cross-shaft 72 which provides the drive for the stitching needle bar through the reduction gear, converter means, and slides discussed above. A sprocket 284, keyed or splined to the shaft 72, drives the roller chain 286 which drives the sprocket 287 to which the hub 36 is secured. A tensioning roller 288 is mounted on the arm 289 which is pivotally mounted to and securable in place on frame upright 8 by means of the bolt 291.

To obtain the correct relationship between the position of the upper cross-shaft 72 and that of the hub 36, means are provided to accommodate adjustment of the rotational position of the hub 36 with respect to the sprocket 287. In the illustrated example, the means provided are the arcuate slots 292 in the hub and the bolts 293 passing through the slots 292 and threadedly engaged with the sprocket 287. The sprocket 287 may be splined to the lower cross-shaft 94 to drive the lower thread locking mechanism (to be described hereinafter) in synchronism with the sewing means described above.

*Sewing means—lower thread—locking mechanism (FIGS. 7, 11, 13–17).*—Generally speaking, it is necessary, for sewing purposes, to engage a loop of sewing thread on the web side of the needle and hold in against retraction by the needle during the upstroke of the needle and, for thread locking purposes, to extend a loop of locking thread through that sewing thread loop and then make the extended locking thread loop pass from the web side of the path of the needle around to the supply side of the path of the needle and hold that locking thread loop in such position long enough for the needle to enter it during its next downstroke. Thus, in the conventional thread-locking mechanism, the looper functions first at the beginning of the needle upstroke, to hook a first sewing thread loop on the web side of the needle and retain it against retraction as the needle completes its upstroke, and then to move across the path of the needle so as to loop the locking thread around the other side of the path of the needle and remains there until that locking thread loop is entered by the needle during its downstroke.

The present invention improves this construction by using a retainer hook to hold the sewing thread against retraction and by providing a separately movable retainer post for the purpose of looping the locking thread around the supply side of the needle and holding that loop until the needle enters it on its downstroke.

The thread-locking mechanism is provided in a plurality of units 76 aligned across the stitching machine, each of which groups comprises: a series of sewing-thread retainer hooks, one for each needle, each hook being supported for rearward sewing-thread-hooking and forward sewing-thread-releasing movement along the web side of its needle; means for supplying locking thread to each retainer hook; means for pulling locking thread from said supply; a series of locking thread retainer posts, one for each retainer hook and needle, each post being supported for transverse reciprocation across the back face of the needle between positions corresponding to the web side and the supply side thereof; means operable, when actuated, to reciprocate the retainer hooks, the thread puller and the retainer posts in timed relationship with each other; and means for lubricating said actuatable means.

*Sewing thread retainer hooks (FIGS. 11–17).*—In the discussion of the sewing thread retainer hooks as well as other components of the stitching machine, reference will be made to the front and rear portions and forward and rearward movement. Forward movement will be understood to be movement in the same general direction as the flow of the web assembly from the rear forwardly through the stitching machine to the front thereof. Front portions will be understood to be portions facing in the direction of movement of the web assembly through the machine.

The sewing thread retainer hooks 77 are secured to a transversely extending mounting bar 78 which is in turn secured through the arms 79 to the retainer hook rocker shaft 81. The rocker shaft 81 is driven by means to be described hereinafter and will be understood to have a rocking or rotational oscillating action in synchronism with reciprocation of the needles. Accordingly, the sewing thread retainer hooks 77 oscillate in synchronism with the reciprocation of the sewing needles 55 and move between a forward position shown by the solid outline in FIG. 13 and a rear position shown by the dotted outline 77A in FIG. 13.

Figure 13:
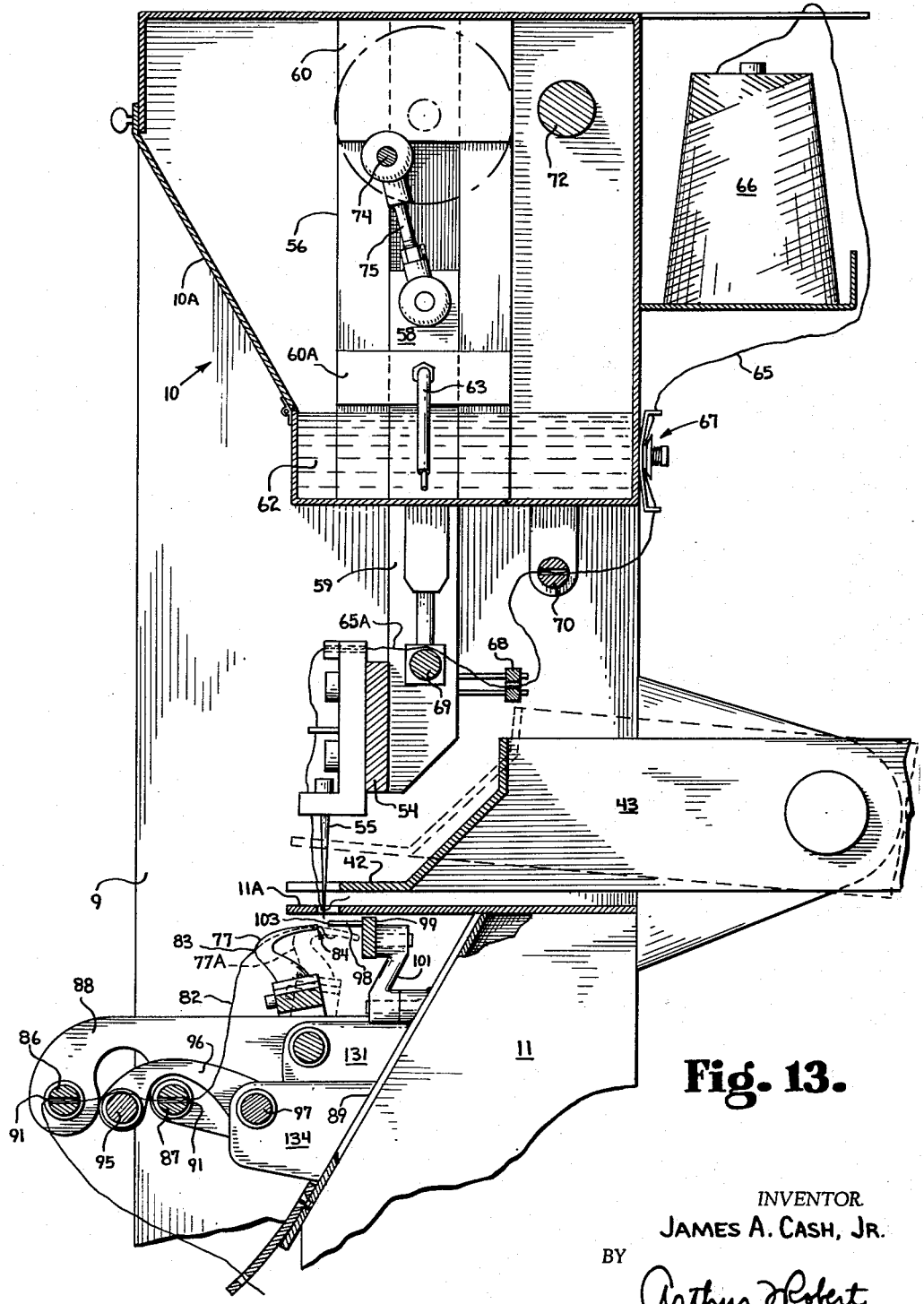
FIG. 13 is an enlarged fragmentary sectional view taken along line 13—13 of FIG. 11 and viewed in the direction of the arrows.
Figure 14:
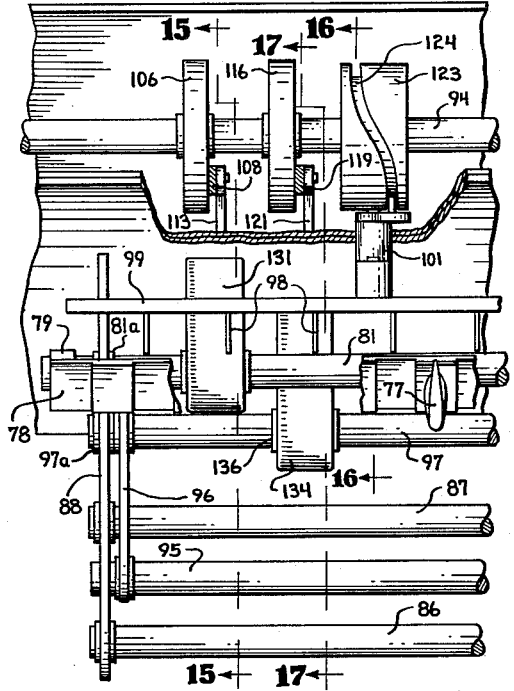
FIG. 14 is a fragmentary top plan view partially in horizontal section showing details of drive means for the sewing thread loop retainer, the locking thread retainer post, and the locking thread puller.
Figure 16:
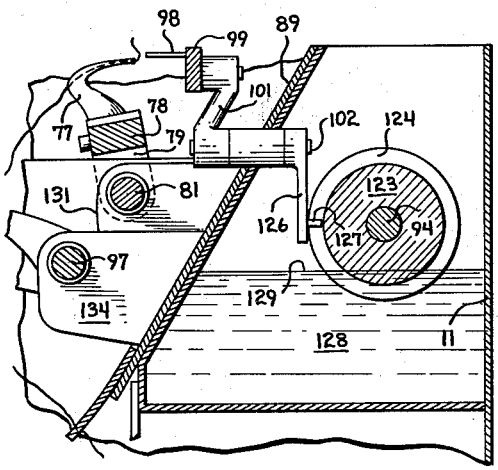
FIG. 16 is a vertical section taken along line 16—16 of FIG. 14 and illustrating details of the locking thread retainer post drive means.
Figure 15:
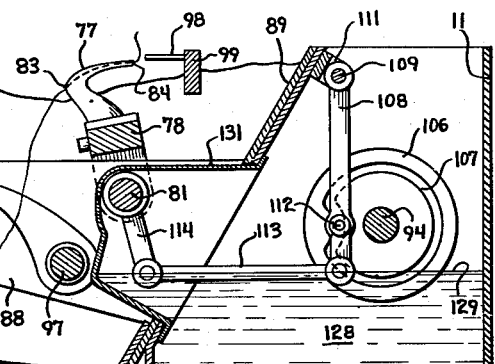
FIG. 15 is a vertical section taken along line 15—15 of FIG. 14 and viewed in the direction of the arrows, illustrating details of the sewing thread retainer hook rocker shaft drive means and housing.
Figure 17:
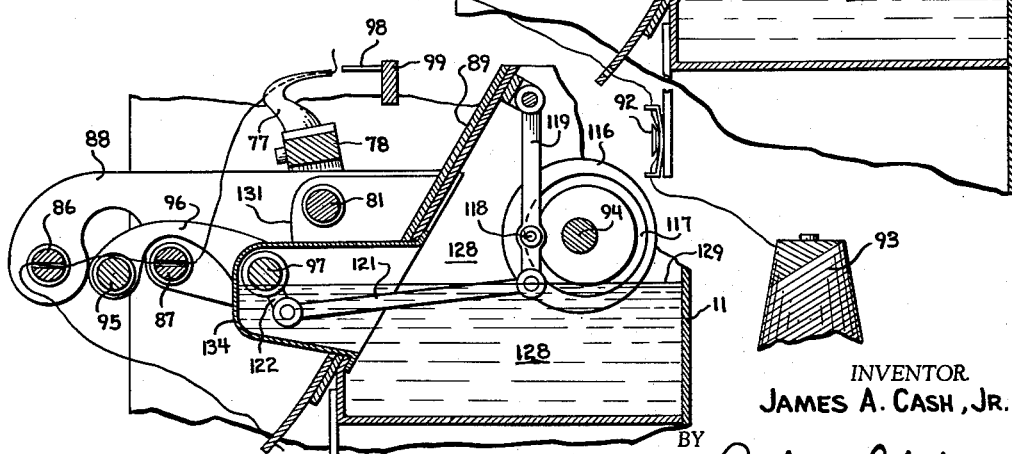
FIG. 17 is a vertical section taken along line 17—17 of FIG. 14 and illustrating details of the locking thread puller rocker shaft drive means and housing.

Each sewing thread retainer hook moves in a plane which is fixed and located on the lefthand or web side of the respective needle with which the hook is associated. Consequently, no retainer hook ever crosses the path of the needle with which it is associated. This novel feature avoids any possibility of interference between the retainer hook and its respective needle even in the event the needle should become bent in any direction other than into the plane of the retainer hook operation. As illustrated in FIG. 13, the locking thread 82 is supplied from the forward margin of the retainer hook through an aperture 83 therein and passageway therethrough to an aperture 84 in the rear distal end of the hook.

*Locking thread pulling means (FIGS. 11, 12–15, 17).*—A pair of parallel, horizontally spaced, transversely extending locking thread guide bars 86, 87 is supported by the arms 88 secured to the front cover plate 89 of the center cross member 11. The forward 86 and rear 87 guide bars are each provided with apertures 91 to receive the locking thread from the adjustable spring loaded tensioner 92 and locking thread supply spool 93. The apertures receiving the thread for a given retainer hook are aligned with the hook in its plane of operation.

A reciprocating, transversely extending locking thread puller bar 95 is mounted by means of the arms 96 to the locking thread puller rocker shaft 97. A rotary oscillating motion is provided for the shaft 97 by means to be described hereinafter. The upward motion of the bar 95 to the position illustrated in FIG. 15 intercepts the spans of thread between the guide bars 86, 87 and thereby pulls thread from the spool 93 for feeding through the retainer hook 77.

*Locking thread retainer posts (FIGS. 11, 13, 14, 16).*—The locking thread retainer posts 98 are mounted on a transversely extending bar 99 pivotally mounted to the crank arms 101 which are in turn pivotally mounted in the front of the intermediate cross member 11. Each of the cranks 101 is mounted to a shaft 102 extending through the front of the cross member 11 and is driven to oscillate rotationally by means to be described hereinafter. Consequently, the retainer post mounting bar 99 is oscillated from left to right in synchronism with the operation of the retainer hooks and sewing needles. As is apparent in FIG. 13, the front end 103 of the retainer post is disposed and movable in a plane immediately to the rear of the path of the sewing needles 55. Therefore, the retainer post never crosses the path of the sewing needle. Likewise, the retainer post never moves across the path of the sewing thread retainer hook.

Figure 11:
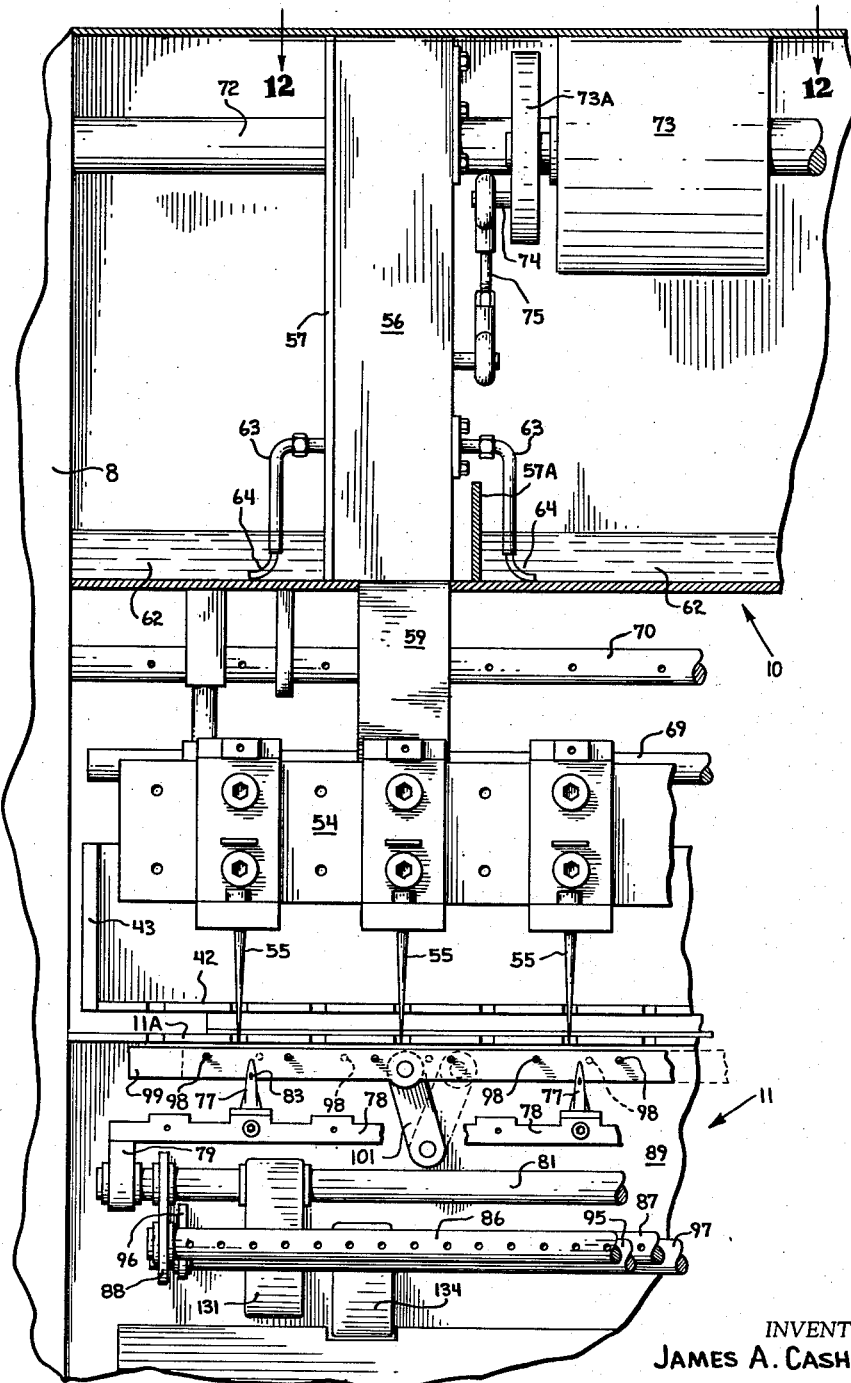
FIG. 11 is a fragmentary front elevation of the stitching machine illustrating details of the needle drive and thread locking means.

As will be apparent from reference to FIGS. 11 and 13, each retainer post moves from a position immediately to the web side of the path of the needle as designated by the dotted outline in FIG. 11, in a direction to the right to a position shown by the solid outline well away from the supply side of the needle.

*Means operating retainer hooks, thread puller and retainer posts (FIGS. 14–17).*—To provide the rotary oscillation of the sewing thread retainer hook rocker shaft 81, a cam is secured to the lower cross-shaft 94 and has a cam groove 107 in the face thereof. A lever 108 is pivotally mounted at 109 to a bracket 111 secured to the cross member 11. The cam lever 108 has a follower, roller or pin 112 following the cam groove and a link 113 is pinned to the distal end of the lever 108. The forward end of the link 113 passes through an opening in the front cover plate 89 and is pinned to the lower end of the rocker shaft crank 114. Thus as the lower cross-shaft 94 rotates in synchronism with the upper cross-shaft 72 as provided by the chain drive already described, the sewing thread retainer hooks are reciprocated in synchronism with the reciprocating needles 55.

The drive for the thread puller is provided in a manner similar to that for the retainer hooks. Cam 116 is secured to the lower cross-shaft 94 and has a groove 117 therein. The follower 118 moving in the groove 117 as the cam 116 rotates, moves the lever 119 which is connected by the link 121 to the puller rocker shaft crank 122. Thus the puller rock shaft is oscillated and the operation of the puller bar 94 is synchronized with the operation of the sewing thread retainer hooks 77.

For the drive of the locking thread retainer posts, a cam 123 having peripheral groove 124 therein is secured to the lower cross-shaft 94. The retainer post drive shaft 102 is connected by the crank arm 126 to the follower 127 which moves in the groove 124 as the shaft 94 rotates. Thus a rocking action is imparted to the shaft 102 as shaft 94 rotates and the transverse oscillatory motion of the retainer post mounting bar 99 is provided in synchronism with retainer hook and needle operation.

*Means for lubricating the locking mechanism (FIGS. 14–17).*—As previously mentioned herein, the intermediate crossmember 11 is hollow. The rear wall, side wall and front wall of the crossmember and the bottom are so constructed as to provide a reservoir 128 within the crossmember which is normally supplied with lubricating oil. The front wall cover plate 89 is secured to the front wall and sealed thereto by a suitable gasket material, the mating faces being finished adequately to accommodate the use of a semi-soft gasket material. The oil level is maintained approximately as designated by reference numeral 129 and thereby thoroughly lubricates the cam grooves, followers and the drive links. Splash and mist created by operation of reciprocating parts in the oil provide adequate lubrication for the connections of the levers 108 and 119 to the crossmember 11.

A housing is provided around each of the rocker shaft cranks and the connection of the crank to its respective drive link. For example, the housing 131 is secured to the cover plate 89 over the opening therein provided for the link 113. This housing is sealed to the front plate and extends upwardly to cover the portion of the rocker shaft 81 extending therethrough. Inasmuch as the rocker shaft 81 may be carried by ball-bearings 81a in the arms 88 secured to the front of crossmember 11, no support bearings are necessary in the housing 131 although they can be provided, if desired. If no support bearings are provided, the provision of a simple dust seal between the rock shaft and the housing is all that is necessary inasmuch as the oil level is below the level of the rocker shaft. The mist within the housing will be adequate to lubricate the dust seal to the extent necessary to avoid undue wear.

Similarly, for the thread puller rock shaft 97, outboard bearings 97a can be provided in the arms 88 and a housing 134 similar to housing 131 is secured and sealed to the cover plate 89. In this instance also, dust seals 136 may be provided and bearings may be omitted. It will be understood, of course, that bearings can be provided in either of the housings 131 or 134 to support the respective rocker shafts at this point if desired.

OPERATION

In the operation of the present invention, a scrim roll is mounted on the cross bar 1B which is supported between the side panels 4 of the supply means. The scrim web 1 is pulled forward and up through the opening 6 in the trough 5 and further upwardly toward the web assembly receiving means in the rear end of the stitching machine. The padding roll 28 is then placed in the trough and as the scrim roll is pulled further forward the padding roll unwinds and the padding and scrim assembly 3 begin to move out of the trough together.

The presser foot 42 is then raised and the assembly of scrim and padding is passed between the presser foot and the table top 11A. It is then pulled further forward, the upper feed roll 16 raised and the assembly interposed between the feed rolls. The upper feed roll is then lowered and the presser foot is allowed to descend.

Assuming that the needles and locking thread retainer hooks have already been threaded, powered operation of the machine can be commenced.

As the feed rolls move and approach the end of their motion for one feed event, the needles 55 have descended to a point immediately above the padding material and the locking thread retainer posts 98 have moved to the supply side of the needle path and started back toward the web side. The sewing thread retainer hooks 77 have moved to their forward position and are moving rearwardly.

After the needle has moved through the web assembly and has started to retract, the locking thread retainer hook has moved rearwardly past the plane of operation of the needles and engaged the sewing thread loop. However, immediately prior to the retainer hook passing the plane of the needles, the locking thread retainer post has moved to the web side of the needle path.

As the needle moves upwardly through the web assembly, the sewing thread retainer hook holds the sewing thread loop down on the underside of the web and the locking thread retainer post moves to the right toward its position on the supply side of the needle, pulling additional locking thread out of the tip of the sewing thread retainer hook.

The feed rolls then move the web assembly one stitch length forward. At the end of movement of the assembly, the needle is descending and the retainer hook is at its forward position again. The locking thread retainer post has started toward the web side of the needle path. Therefore, a locking thread loop is prepared around the path of the needle. This loop extends from within the sewing thread loop of the previous stitch around the needle path from the supply side to the web side thereof and back through the sewing thread loop of the previous stitch, and into the distal end of the sewing thread retainer hook. Therefore, as the needle now descends through the locking thread loop, a sewing thread loop is established through the locking thread loop passing from the web side to the supply side of the needle. Again, as the needle moves out of the web, the retainer hook moves into the new sewing thread loop to retain it during withdrawal of the needle. The above described cycle is then repeated as the stitching continues.

In this description, it will be observed that the retainer post picks up the locking thread projecting rearwardly and not only holds it against forward retraction as the sewing thread retainer hook retracts forwardly, but also establishes a locking thread loop and widens it so that the needle will pass through the locking thread loop on its next downstroke.

*The stitch obtained (FIGS. 18, 19).*—In FIGS. 18 and 19, the scrim 151 is sewn together with the pad 152 by the sewing thread 153, and the locking thread 154. It should be understood that the movement of the material through the sewing means was in the direction of the arrow 156.

Referring to the first illustrated needle perforation 157 it will be seen that the sewing thread from the preceding stitch (not shown) includes the portion 153a passing down through the needle perforation, looped at 158 and passing upwardly at portion 153b out of the perforation 157.

The portion 154a of the locking thread was passed through sewing thread loop 158 by the sewing thread loop retainer hook and moved by the locking thread retainer post from the web side to the supply side of the needle path prior to the making of perforation 159 by the sewing needle (not shown). Shortly after moving to the limit of its travel on the supply side of the needle path and prior to perforation 159, the locking thread retainer post began its return to the web side of the needle path and formed the locking thread loop 166 with the portion 154a on the supply side of the needle path and the portion 154b on the web side of the needle path and returning to the locking thread retainer post (not shown).

Similarly, the locking thread portion 154c which was derived from additional locking thread issuing from the locking thread supply (not shown) through the sewing thread retainer hook after removal of the hook from sewing thread loop 158, was passed through the sewing thread loop 161 by the sewing thread retainer hook upon withdrawal of the needle from perforation 159. The next locking thread loop 167 was formed in the same manner as described for loop 166.

It is thus seen how the stitch illustrated in FIGS. 18 and 19 was formed by the mechanism of the illustrated embodiment of this invention.

*Conclusion*

From the foregoing, many of the advantages mentioned from time to time throughout the description can be appreciated as well as others naturally derived from the novel construction of the present invention and it will, of course, be recognized that the present invention is not limited to employment with web and padding materials such as described but can secure together other materials as well. It, therefore accomplishes all of the objects set out above as well as others which have not specifically been mentioned.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A multi-needle machine of the intermittent feed type for securing together the components of an elongate multilayer web by progressively sewing the web in the direction of its length along a number of longitudinally-extending transversely-spaced stitch lines, comprising:
   (A) a frame having, between its longitudinally-spaced front and rear ends,
      (1) a transversely spaced pair of upright frame members and
      (2) a vertically spaced pair of cross members extending horizontally from one upright member to the other and secured to both,
         (a) the upper cross member being hollow;
   (B) web advancing means operable, when actuated, to advance the web forwardly between said upper and lower cross members in intermittent fashion, said advancing means including
      (1) a pair of pinch rolls mounted on the frame to receive the advancing web between them,
      (2) an oscillatable lever pivotally mounted on the frame,
      (3) a one-way clutch connected to drive one pinch roll, and
      (4) an arm interconnecting said lever and clutch for clutch-driving purposes;
   (C) a multi-needle bar
      (1) extending transversely between said lower and upper cross members, and
      (2) supporting a transversely extending succession of vertically-arranged horizontally-spaced sewing needles;
   (D) an upper needle-operating mechanism operable, when actuated, to reciprocate said needle bar vertically and thereby move said needles downwardly and upwardly through the web to form depending loops of sewing thread on the under side thereof, said mechanism including
- (1) a first rotary power shaft crossing said machine within said upper hollow cross member,
- (2) a pair of transversely-spaced blocks supporting said multi-needle bar for vertical reciprocation,
  - (a) said blocks being mounted on said upper cross member for vertically slidable movement, and
- (3) motion-converting power-transmitting means interconnecting said first shaft with each block to use the rotary movement of said shaft to effect the vertically slidable needle-reciprocating movement of said blocks;

(E) a lower thread-locking mechanism operable, when actuated, to engage and lock said sewing-thread-loops; and (F) drive means
- (1) for actuating said web-advancing and needle-operating means to advance the web and reciprocate the needles alternately, and
- (2) for actuating the thread-locking mechanism in timed relationship with the needle-operating mechanism so as to engage and lock each succession of depending sewing thread loops.

2. A multi-needle machine of the intermittent feed type for securing together the components of an elongate multi-layer web by progressively sewing the web in the direction of its length along a number of longitudinally-extending transversely-spaced stitch lines, comprising:

(A) a frame having, between its longitudinally-spaced front and rear ends,
- (1) a transversely spaced pair of upright frame members and
- (2) a vertically spaced pair of cross members extending horizontally from one upright member to the other and secured to both,
  - (a) the upper cross member being hollow;

(B) web advancing means operable, when actuated, to advance the web forwardly between said upper and lower cross members in intermittent fashion, said advancing means including
- (1) a lower pinch roll mounted on the frame,
- (2) an upper pinch roll normally pressing gravitationally downward through the path of the web against the lower roll,
- (3) a pair of one-way clutches, one for each pinch roll, each clutch connected to drive its pinch roll,
- (4) a pair of arms, one for each clutch, each arm connected to drive its clutch, and
- (5) an oscillatable seesaw lever pivotally mounted at its midportion on the frame with its ends connected to reciprocate said arms;

(C) a multi-needle bar
- (1) extending transversely between said lower and upper cross members, and
- (2) supporting a transversely extending succession of vertically-arranged horizontally-spaced sewing needles;

(D) an upper needle-operating mechanism operable, when actuated, to reciprocate said needle bar vertically and therby move said needles downwardly and upwardly through the web to form depending loops of sewing thread on the under side thereof, said mechanism including
- (1) a first rotary power shaft crossing said machine within said upper hollow cross member,
- (2) a pair of transversely-spaced blocks supporting said multi-needle bar for vertical reciprocation,
  - (a) said blocks being mounted on said upper cross member for vertically slidable movement, and
- (3) motion-converting power-transmitting means interconnecting said first shaft with each block to use the rotary movement of said shaft to effect the vertically slidable needle-reciprocating movement of said blocks;

(E) a lower thread-locking mechanism operable, when actuated, to engage and lock said sewing-thread-loops; and (F) drive means
- (1) for actuating said web-advancing and needle-operating means to advance the web and repicrocate the needles alternately, and
- (2) for actuating the thread-locking mechanism in timed relationship with the needle-operating mechanism so as to engage and lock each succession of depending sewing thread loops.

3. The machine of claim 2 including:
(A) means for adjusting the angular throw of said seesaw lever to vary the distance over which the web moves during each advance.

4. The machine of claim 2 wherein:
(A) said upper pinch roll is movable upwardly to a web-threading position;
(B) a guide arm is connected at one end to the upper pinch roll and pivotally connected at its opposite end to said frame to guide said upper roll during its movement from its web-advancing position to its web-threading position; and
(C) means for latching the upper pinch roll in its web-threading position.

5. A multi-needle machine of the intermittent feed type for securing together the components of an elongate multi-layer web by progressively sewing the web in the direction of its length along a number of longitudinally-extending transversely-spaced stitch lines, comprising:

(A) a frame having, between its longitudinally-spaced front and rear ends,
- (1) a transversely spaced pair of upright frame members and
- (2) vertically spaced pair of cross members extending horizontally from one upright member to the other and secured to both,
  - (a) the upper cross member being hollow;

(B) web advancing means operable, when actuated, to advance the web forwardly between said upper and lower cross members in intermittent fashion;

(C) a multi-needle bar
- (1) extending transversely between said lower and upper cross members, and
- (2) supporting a transversely extending succession of vertically-arranged horizontally-spaced sewing needles;

(D) an upper needle-operating mechanism operable, when actuated, to reciprocate said needle bar vertically and thereby move said needles downwardly and upwardly through the web to form depending loops of sewing thread on the under side thereof, said mechanism including
- (1) a first rotary power shaft crossing said machine within said upper hollow cross member,
- (2) a pair of transversely-spaced blocks supporting said multi-needle bar for vertical reciprocation,
  - (a) said blocks being mounted on said upper cross member for vertically slidable movement, and
- (3) motion-converting power-transmitting means interconnecting said first shaft with each block to use the rotary movement of said shaft to effect the vertically slidable needle-reciprocating movement of said blocks;

(E) a lower thread-locking mechanism operable, when actuated, to engage and lock said sewing-thread-loops;

(F) a presser foot normally extending transversely across the machine in an operative position along the top side of the path of the web with its front edge slotted to accommodate the needles;
(G) a pair of legs, one extending from each end portion of the presser foot rearwardly along the side of the corresponding upright;
(H) means pivoting each leg to the adjacent upright to mount the presser foot thereon for swinging movement downwardly toward and upwardly away from its operative position; and
(I) drive means
   (1) for actuating said web-advancing and needle-operating means to advance the web and reciprocate the needles alternately, and
   (2) for actuating the thread-locking mechanism in timed relationship with the needle-operating mechanism so as to engage and lock each succession of depending sewing thread loops.

6. The machine of claim 5 wherein:
(A) said pivoted presser foot legs extend rearwardly beyond their frame pivots; and
(B) said machine includes
   (1) means biasing the presser foot downwardly toward its operative position, and
   (2) means adjustably interconnecting the rear ends of said legs with the frame to control the magnitude of the downward bias of the presser foot.

7. The machine of claim 6 wherein:
(A) said adjustable interconnecting means includes
   (1) a link connected to the rear end portion of a presser foot leg to extend downwardly therefrom,
   (2) a member mounted on said frame to extend vertically adjacent the link but intermediate the ends thereof,
   (3) a spring interconnecting one end portion of said member with a higher portion of said link so that the tensioning of the spring will urge the link downwardly to decrease the presser foot bias, and
   (4) a spring interconnecting another end portion of said member with a lower portion of said link so that the tensioning of said spring will urge the link upwardly and correspondingly increase the presser foot bias.

8. A multi-needle machine of the intermittent feed type for securing together the components of an elongate multi-layer web by progressively sewing the web in the direction of its length along a number of longitudinally-extending transversely-spaced stitch lines, comprising:
(A) a frame having, between its longitudinally-spaced front and rear ends,
   (1) a transversely spaced pair of upright frame members and
   (2) a vertically spaced pair of cross members extending horizontally from one upright member to the other and secured to both,
      (a) the upper cross member being hollow;
(B) web advancing means operable, when actuated, to advance the web forwardly between said upper and lower cross members in intermittent fashion;
(C) a multi-needle bar
   (1) extending transversely between said lower and upper cross members, and
   (2) supporting a transversely extending succession of vertically-arranged horizontally-spaced sewing needles;
(D) an upper needle-operating mechanism operable, when actuated, to reciprocate said needle bar vertically and thereby move said needles downwardly and upwardly through the web to form depending loops of sewing thread on the under side thereof, said mechanism including
   (1) a first rotary power shaft crossing said machine within said upper hollow cross member,
   (2) a pair of transversely-spaced blocks supporting said multi-needle bar for vertical reciprocation,
      (a) said slide blocks being mounted in vertically arranged slideways carried by the upper cross member,
   (3) motion-converting power-transmitting means interconnecting said first shaft with each block to use the rotary movement of said shaft to effect the vertically slidable needle-reciprocating movement of said blocks;
(E) means for lubricating said slideways including
   (1) an oil bath in said upper hollow cross chamber and
   (2) means for conducting lubricant from said oil bath to said slideways;
(F) a lower thread-locking mechanism operable, when actuated, to engage and lock said sewing-thread-loops; and
(G) drive means
   (1) for actuating said web-advancing and needle-operating means to advance the web and reciprocate the needles alternately, and
   (2) for actuating the thread-locking mechanism in timed relationship with the needle-operating mechanism so as to engage and lock each succession of depending sewing thread loops.

9. A multi-needle machine of the intermittent feed type for securing together the components of an elongate multi-layer web by progressively sewing the web in the direction of its length along a number of longitudinally-extending transversely-spaced stitch lines, comprising:
(A) a frame having, between its longitudinally-spaced front and rear ends,
   (1) a transversely spaced pair of upright frame members and
   (2) a vertically spaced pair of cross members extending horizontally from one upright member to the other and secured to both,
      (a) the upper cross member being hollow and being divided by partitions into a dry chamber for each slide block and an oil bath chamber on each side of each dry chamber;
(B) web advancing means operable, when actuated, to advance the web forwardly between said upper and lower cross members in intermittent fashion;
(C) a multi-needle bar
   (1) extending transversely between said lower and upper cross members, and
   (2) supporting a transversely extending succession of vertically-arranged horizontally-spaced sewing needles;
(D) an upper needle-operating mechanism operable, when actuated, to reciprocate said needle bar vertically and thereby move said needles downwardly and upwardly through the web to form depending loops of sewing thread on the under side thereof, said mechanism including
   (1) a first rotary power shaft crossing said machine within said upper hollow cross member,
   (2) a pair of transversely-spaced blocks supporting said multi-needle bar for vertical reciprocation,
      (a) each slide block being mounted on said upper cross member in vertically arranged slideways within its dry chamber, and
   (3) motion-converting power-transmitting means interconnecting said first shaft with each block to use the rotary movement of said shaft to effect the vertically slidable needle-reciprocating movement of said blocks;
(E) capillary means interconnecting the oil baths on each side of a dry chamber with the slideways in that dry chamber;
(F) a lower thread-locking mechanism operable, when actuated, to engage and lock said sewing-thread loops; and (G) drive means
- (1) for actuating said web-advancing and needle-operating means to advance the web and reciprocate the needles alternately, and
- (2) for actuating the thread-locking mechanism in timed relationship with the needle-operating mechanism so as to engage and lock each succession of depending sewing thread loops.

References Cited by the Examiner

UNITED STATES PATENTS

| | | | |
|---|---|---|---|
| 1,253,519 | 1/18 | Osterhout | 112—2 |
| 1,485,804 | 3/24 | Neddersen | 112—203 |
| 1,636,517 | 7/27 | Krasa | 112—203 |
| 1,944,388 | 1/34 | Zimmerman et al. | 112—2 |
| 2,156,820 | 5/39 | Salyers | 242—55 |
| 2,268,319 | 12/41 | Barron | 112—256 |
| 2,325,643 | 8/43 | Weis | 112—214 |
| 2,336,404 | 12/43 | Kelly | 112—214 |
| 2,502,894 | 4/50 | Schlums | 242—55.1 |
| 2,548,361 | 4/51 | Ginwright | 112—235 X |
| 2,688,293 | 9/54 | Hayes et al. | 112—199 |
| 2,697,995 | 12/54 | Nicolay | 112—256 |
| 2,780,192 | 2/57 | Attwood | 112—256 |
| 2,791,193 | 5/57 | Parry | 112—256 |
| 2,966,866 | 1/61 | Card | 112—796 |
| 2,989,017 | 6/61 | Taketomi | 112—187 |

JORDAN FRANKLIN, *Primary Examiner.*

DAVID J. WILLIAMOWSKY, *Examiner.*